J. HAGGERT.
Axle-Nut.
No. 59,835.  Patented Nov. 20, 1866.
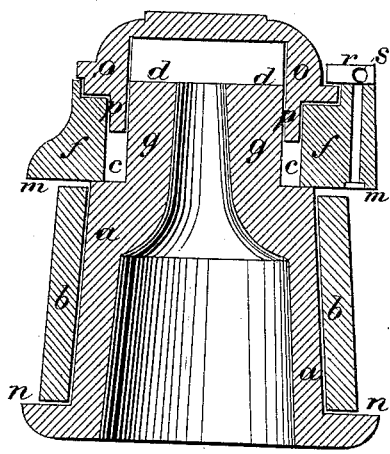
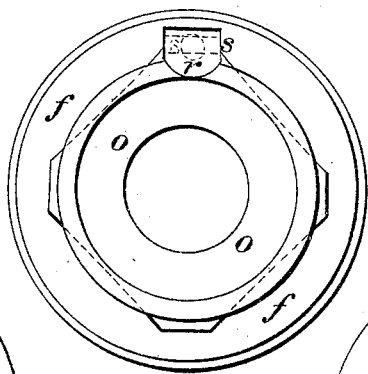
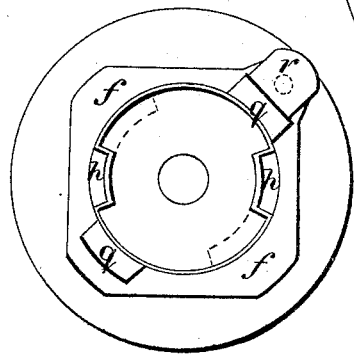
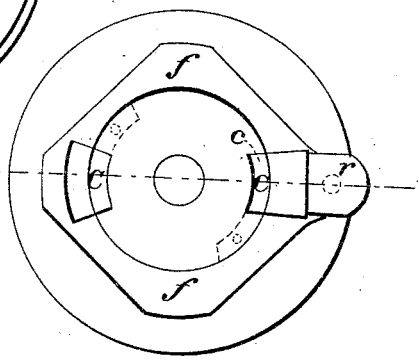
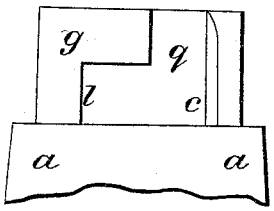
Witnesses:  Inventor:

United States Patent Office.

IMPROVEMENT IN AXLE-NUTS FOR WAGONS, &c.

JOHN HAGGERT, OF NEW YORK.

Letters Patent No. 59,835, dated November 20, 1866.

SPECIFICATION.

TO ALL WHOM IT MAY CONCERN:

Be it known that I, JOHN HAGGERT, in the city, county, and State of New York, have invented a new and useful improvement in Mode of Securing Wheels to their Axles; and I do hereby declare that the following is a full, clear, and exact description thereof, which will enable others skilled in the art to make and use the same, reference being had to the accompanying drawing forming part of this specification:

In the use of wagons, much difficulty and annoyance have heretofore been experienced in the frequent unscrewing of the nuts used to fasten their wheels upon the axles; and to remedy this difficulty is the principal object of the present invention, which consists in the employment, for the purpose named, of a bayonet-joint, of the peculiar form hereinafter described.

My improvement is represented in accompanying plate of drawings, of which—

Figure 1 is a central section through a portion of a wheel axle, in the direction of its length, showing my new mode of securing or holding the wheel thereon.

Figure 2, a view of the outer end of the same.

Figures 3 and 4, similar views with outer cap removed, respectively showing axle-nut when locked and unlocked upon the axle.

Figure 5, detail view.

$a\ a$, in the drawings, represent the portion of an axle on which the wheel turns; $b\ b$ the bushing of the wheel hub, secured to it in the ordinary manner, and fitting over and upon the axle, $a$, to which it is fastened, as will be described; $c\ c$ two right-angular-shaped grooves or recesses, formed in the outer portion of the axle, $a$, and extending in the same direction from its end, $d$, to and along the hub, $b$, partially around the periphery of the axle; $f$ a ring or nut of nearly the same thickness as the outer portion, $g$, of axle, having upon its inner periphery two projecting pieces, $h\ h$, of same width as grooves, $c$, and at corresponding points of the same to those of the grooves of the axle, in which, when the nut is placed on it, they fit and move, coming to a bearing against the inner ends, $l\ l$, of the same, and leaving that portion of the grooves extending in the direction of the length of the axle, open. The ring, $f$, is also made of considerably larger external diameter than the axle, forming a shoulder, $m$, by its inner end, around the same, between which and the shoulder, $n$, of the axle the hub of the wheel is held, the nut being securely held thereon, and prevented from allowing the wheel to work off as the wagon is used, by means of a cap-plate, $o$, having projecting prongs or arms, $p\ p$, upon its inner side, corresponding in shape and length to that of the part $q$ of the grooves, and at similar points thereof to the same, a swivelled button, $r$, on the outer end of the nut being turned around so as to bear upon the plate to hold it in position. In button $r$ is an aperture, $s$, for receiving any suitable device for convenience in turning the same.

To detach the wheel from the axle first unbutton the cap-plate, which having removed, turn the nut sufficiently on the axle to bring its projecting pieces in the portion, $q$, of the grooves extending in the direction of the axle's length, when it can then be readily taken off, as is evident, leaving the wheel free to be removed at pleasure.

From the above description it is apparent that, by forming upon the axle right-angular-shaped grooves, in which fit projecting pieces on the nut, together with the projecting arms of the cap-plates inserted within the said grooves and held upon the nut as described, a secure fastening for the wheel thereon is obtained, and one that when desired can be easily and readily detached from or inserted on the axle at pleasure.

In lieu of the button a set-screw can be used, and also the cap-plate can be dispensed with, and the nut held in position by means of a set-screw, or in any other proper manner, although I deem it the best to secure it as described; and it is evident that various forms may be given to the cap-plate other than that described and represented, and also that more than two grooves can be used, but two I deem sufficient.

Among the many advantages of my improvement may be mentioned its great durability, cheapness, and simplicity in manufacture and construction, the facility with which it can be attached to or removed from the axle, &c.

It may be here remarked that the right-angular grooves may be as well formed in the nut and the projecting pieces upon the axle, and, therefore, I do not intend to limit myself to the particular mode described.

I claim as new, and desire to secure by Letters Patent—

The combination with the axle-arm, $a$, and collar, $f$, of the grooves, $c\ q\ l$, projections $h$, and cap $o\ p$, when all are constructed and arranged as herein specified, to form a bayonet-joint with a shoulder at right angles to the axis to secure the wheel upon the axle, as explained.

The above specification of my invention signed by me this twenty-fourth day of April, A. D. 1865.

JOHN HAGGERT.

Witnesses:
M. M. LIVINGSTON,
C. L. TOPLIFF.